(12) United States Patent
Hayashi

(10) Patent No.: US 9,336,565 B2
(45) Date of Patent: May 10, 2016

(54) IMAGE PROCESSING DEVICE, DISPLAY APPARATUS, AND IMAGE PROCESSING METHOD

(71) Applicant: SEIKO EPSON CORPORATION, Tokyo (JP)

(72) Inventor: Tadashi Hayashi, Chino (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 14/719,914

(22) Filed: May 22, 2015

(65) Prior Publication Data

US 2015/0348267 A1 Dec. 3, 2015

(30) Foreign Application Priority Data

May 30, 2014 (JP) .................................. 2014-112522

(51) Int. Cl.
*G06K 9/32* (2006.01)
*G06T 3/00* (2006.01)

(52) U.S. Cl.
CPC ........................................ *G06T 3/00* (2013.01)

(58) Field of Classification Search
USPC .............. 382/294, 260, 235, 277; 345/84, 89, 345/102, 208, 589; 349/38, 39, 48
See application file for complete search history.

(56) References Cited

U.S. PATENT DOCUMENTS

| | | | | |
|---|---|---|---|---|
| 5,007,099 A | * | 4/1991 | Matsushima | ............. G06T 5/20 382/235 |
| 6,762,792 B1 | | 7/2004 | Matsumura | |
| 8,878,757 B2 | * | 11/2014 | Yoshida | ............... G09G 3/3406 345/84 |
| 9,035,867 B2 | * | 5/2015 | Yoshida | ............ G02F 1/136277 345/102 |

FOREIGN PATENT DOCUMENTS

| | | |
|---|---|---|
| JP | H03-154175 A | 7/1991 |
| JP | H08-44862 A | 2/1996 |
| JP | H08-138039 A | 5/1996 |
| JP | H09-147097 A | 6/1997 |
| JP | H09-311934 A | 12/1997 |
| JP | H10-336573 A | 12/1998 |
| JP | 2000-050372 A | 2/2000 |
| JP | 2000-090257 A | 3/2000 |
| JP | 2000-182067 A | 6/2000 |
| JP | 2003-271378 A | 9/2003 |
| JP | 2006-211402 A | 8/2006 |
| JP | 2012-019338 A | 1/2012 |

* cited by examiner

*Primary Examiner* — Anh Do
(74) *Attorney, Agent, or Firm* — Oliff PLC

(57) ABSTRACT

An image processing device includes: a first memory section that has memory areas equivalent to data of k1 rows of an image and stores data of at least two adjoining pixels in each of the memory areas; a second memory section that has memory areas equivalent to data of k2 rows of the image and stores data of at least two adjoining pixels in a row different from pixels of which data is stored in the first memory section in each of the memory areas; and a correction section that corrects data of an object pixel, out of pixels of r rows×c columns, using data of a plurality of pixels stored in a memory area corresponding to a position designated by an offset vector corresponding to the object pixel in the first and second memory sections.

8 Claims, 18 Drawing Sheets

① : VRAM1211
② : VRAM1212
③ : VRAM1213
④ : VRAM1214

VRAM1211

| (0, 0) (1, 0) | (4, 0) (5, 0) | ... | (796, 0) (797, 0) |
|---|---|---|---|
| (0, 2) (1, 2) | (4, 2) (5, 2) | | |
| | | | |
| (0, 478) (1, 478) | (4, 478) (5, 478) | | (796, 478) (797, 478) |

VRAM1212

| (2, 0) (3, 0) | (6, 0) (7, 0) | ... | (798, 0) (799, 0) |
|---|---|---|---|
| (2, 2) (3, 2) | (6, 2) (7, 2) | | |
| | | | |
| (2, 478) (3, 478) | (6, 478) (7, 478) | | (798, 478) (799, 478) |

VRAM1213

| (0, 1) (1, 1) | (4, 1) (5, 1) | ... | (796, 1) (797, 1) |
|---|---|---|---|
| (0, 3) (1, 3) | (4, 3) (5, 3) | | |
| | | | |
| (0, 479) (1, 479) | (4, 479) (5, 479) | | (796, 479) (797, 479) |

VRAM1214

| (2, 1) (3, 1) | (6, 1) (7, 1) | ... | (798, 1) (799, 1) |
|---|---|---|---|
| (2, 3) (3, 3) | (6, 3) (7, 3) | | |
| | | | |
| (2, 479) (3, 479) | (6, 479) (7, 479) | | (798, 479) (799, 479) |

FIG. 6

VRAM1211

| (0, 0) (1, 0) | (4, 0) (5, 0) | ... | (796, 0) (797, 0) |
|---|---|---|---|
| (0, 2) (1, 2) | (4, 2) (5, 2) | | |
| | | | |
| (0, 478) (1, 478) | (4, 478) (5, 478) | | (796, 478) (797, 478) |

VRAM1212

| (2, 0) (3, 0) | (6, 0) (7, 0) | ... | (798, 0) (799, 0) |
|---|---|---|---|
| (2, 2) (3, 2) | (6, 2) (7, 2) | | |
| | | | |
| (2, 478) (3, 478) | (6, 478) (7, 478) | | (798, 478) (799, 478) |

VRAM1213

| (0, 1) (1, 1) | (4, 1) (5, 1) | ... | (796, 1) (797, 1) |
|---|---|---|---|
| (0, 3) (1, 3) | (4, 3) (5, 3) | | |
| | | | |
| (0, 479) (1, 479) | (4, 479) (5, 479) | | (796, 479) (797, 479) |

VRAM1214

| (2, 1) (3, 1) | (6, 1) (7, 1) | ... | (798, 1) (799, 1) |
|---|---|---|---|
| (2, 3) (3, 3) | (6, 3) (7, 3) | | |
| | | | |
| (2, 479) (3, 479) | (6, 479) (7, 479) | | (798, 479) (799, 479) |

FIG. 12

VRAM1211

| (0, 0) (1, 0) | (4, 0) (5, 0) | ... | (796, 0) (797, 0) |
|---|---|---|---|
| (0, 2) (1, 2) | (4, 2) (5, 2) | | |
| | | | |
| (0, 478) (1, 478) | (4, 478) (5, 478) | | (796, 478) (797, 478) |

VRAM1212

| (2, 0) (3, 0) | (6, 0) (7, 0) | ... | (798, 0) (799, 0) |
|---|---|---|---|
| (2, 2) (3, 2) | (6, 2) (7, 2) | | |
| | | | |
| (2, 478) (3, 478) | (6, 478) (7, 478) | | (798, 478) (799, 478) |

VRAM1213

| (0, 1) (1, 1) | (4, 1) (5, 1) | ... | (796, 1) (797, 1) |
|---|---|---|---|
| (0, 3) (1, 3) | (4, 3) (5, 3) | | |
| | | | |
| (0, 479) (1, 479) | (4, 479) (5, 479) | | (796, 479) (797, 479) |

VRAM1214

| (2, 1) (3, 1) | (6, 1) (7, 1) | ... | (798, 1) (799, 1) |
|---|---|---|---|
| (2, 3) (3, 3) | (6, 3) (7, 3) | | |
| | | | |
| (2, 479) (3, 479) | (6, 479) (7, 479) | | (798, 479) (799, 479) |

FIG. 13

VRAM1211

| (0, 0) (1, 0) | (4, 0) (5, 0) | ... | (796, 0) (797, 0) |
|---|---|---|---|
| (0, 2) (1, 2) | (4, 2) (5, 2) | | |
| | | | |
| (0, 478) (1, 478) | (4, 478) (5, 478) | | (796, 478) (797, 478) |

VRAM1212

| (2, 0) (3, 0) | (6, 0) (7, 0) | ... | (798, 0) (799, 0) |
|---|---|---|---|
| (2, 2) (3, 2) | (6, 2) (7, 2) | | |
| | | | |
| (2, 478) (3, 478) | (6, 478) (7, 478) | | (798, 478) (799, 478) |

VRAM1213

| (0, 1) (1, 1) | (4, 1) (5, 1) | ... | (796, 1) (797, 1) |
|---|---|---|---|
| (0, 3) (1, 3) | (4, 3) (5, 3) | | |
| | | | |
| (0, 479) (1, 479) | (4, 479) (5, 479) | | (796, 479) (797, 479) |

VRAM1214

| (2, 1) (3, 1) | (6, 1) (7, 1) | ... | (798, 1) (799, 1) |
|---|---|---|---|
| (2, 3) (3, 3) | (6, 3) (7, 3) | | |
| | | | |
| (2, 479) (3, 479) | (6, 479) (7, 479) | | (798, 479) (799, 479) |

FIG. 14

VRAM1211

| (0, 0) (1, 0) | (4, 0) (5, 0) | ... | (796, 0) (797, 0) |
|---|---|---|---|
| (0, 2) (1, 2) | (4, 2) (5, 2) | | |
| | | | |
| (0, 478) (1, 478) | (4, 478) (5, 478) | | (796, 478) (797, 478) |

VRAM1212

| (2, 0) (3, 0) | (6, 0) (7, 0) | ... | (798, 0) (799, 0) |
|---|---|---|---|
| (2, 2) (3, 2) | (6, 2) (7, 2) | | |
| | | | |
| (2, 478) (3, 478) | (6, 478) (7, 478) | | (798, 478) (799, 478) |

VRAM1213

| (0, 1) (1, 1) | (4, 1) (5, 1) | ... | (796, 1) (797, 1) |
|---|---|---|---|
| (0, 3) (1, 3) | (4, 3) (5, 3) | | |
| | | | |
| (0, 479) (1, 479) | (4, 479) (5, 479) | | (796, 479) (797, 479) |

VRAM1214

| (2, 1) (3, 1) | (6, 1) (7, 1) | ... | (798, 1) (799, 1) |
|---|---|---|---|
| (2, 3) (3, 3) | (6, 3) (7, 3) | | |
| | | | |
| (2, 479) (3, 479) | (6, 479) (7, 479) | | (798, 479) (799, 479) |

Cache 1261

| (0, 0) | (1, 0) |
|---|---|
| (0, 1) | (1, 1) |

FIG. 15

IMAGE PROCESSING DEVICE, DISPLAY APPARATUS, AND IMAGE PROCESSING METHOD

BACKGROUND

1. Technical Field

The present invention relates to a technology for correcting images.

2. Related Art

In a projector, when the positional relationship between a screen and a projection system is deviated from an ideal state, the image projected on the screen is distorted. To cancel out this distortion, image processing of imparting a distortion opposite to the existing distortion to the input image is used. This image processing is performed for a pixel to be processed of the input image by referring to data of another pixel at a position designated by an offset vector corresponding to the pixel to be processed. In this case, when the components of the offset vector are not integers, the image processing is performed referring to data of four pixels around the position designated by the offset vector.

To perform image processing using data of four pixels, it is naturally required to read data of four pixels from a memory. That is, it is necessary to access one RAM four times, taking a time of four clocks to read the data. For example, in comparison with the case that the components of the offset vector are integers, it will take four times to read data, and the output of the image signal will be delayed by this long read time.

JP-A-10-336573 discloses a technique of accessing a memory at a clock rate double the image clock to generate a zoom image using data of two pixels in the vertical direction.

The above technique has a problem that the necessity of generating a high-speed clock increases the cost of the image processing circuit.

SUMMARY

An advantage of some aspects of the invention is providing a technique of shortening the time of obtaining data used for correction without use of a high-speed clock for memory access.

According to a first aspect of the invention, an image processing device that processes an image displayed on a display section having pixels of r rows×c columns is provided. The device includes: a first memory section that has a plurality of memory areas equivalent to data of k1 rows of the image and stores data of at least two adjoining pixels in each of the plurality of memory areas; a second memory section that has a plurality of memory areas equivalent to data of k2 rows of the image (k1 and k2 are natural numbers satisfying Omax< (k1+k2)<r where Omax is an offset maximum value set previously for the display section) and stores data of at least two adjoining pixels in a row different from pixels of which data is stored in the first memory section in each of the plurality of memory areas; and a correction section that corrects data of an object pixel, out of the pixels of r rows×c columns, using data of a plurality of pixels stored in a memory area corresponding to a position designated by an offset vector corresponding to the object pixel in the first memory section and the second memory section.

According to the above image processing device, the time required to obtain data used for correction can be shortened without use of a high-speed clock for memory access.

When the position designated by the offset vector is located between a pixel stored in a first memory area of the first memory section and a pixel stored in a second memory area of the second memory section, the correction section may perform the correction using data stored in the first memory area and the second memory area.

According to the above image processing device, the correction can be made even when the position designated by the offset vector is located between a pixel stored in the first memory area of the first memory section and a pixel stored in the second memory area of the second memory section.

When the position designated by the offset vector is located between two pixels stored in two memory areas of the first memory section, the correction section may perform the correction using data sequentially read from the two memory areas.

According to the above image processing device, the correction can be made even when the position designated by the offset vector is located between two pixels stored in two memory areas of the first memory section.

The image processing device may further include a cache memory section that stores data used by the correction section in the latest unit period, wherein, when the object pixel has moved by one pixel from the latest unit period, the correction section may perform the correction using data stored in the cache memory section and data stored in either the first memory section or the second memory section.

According to the above image processing device, the data read time can be more shortened compared with the case that the cache memory section is not used.

The image processing device may further include: a third memory section that stores data of at least two adjoining pixels including a pixel adjoining, in the same row, a pixel of which data is stored in the first memory section; and a fourth memory section that stores data of at least two adjoining pixels including a pixel adjoining, in the same row, a pixel of which data is stored in the second memory section, wherein the correction section may correct data of the object pixel using data of a plurality of pixels stored in memory areas, in the first memory section, the second memory section, the third memory section, and the fourth memory section, corresponding to a position designated by an offset vector corresponding to the object pixel.

According to the above image processing device, the data read time can be more shortened compared with the case that the third and fourth memory sections are not used.

According to a second aspect of the invention, a display apparatus is provided. The apparatus includes: a display section having pixels of r rows×c columns; a first memory section that has a plurality of memory areas equivalent to data of k1 rows of an image displayed on the display section and stores data of at least two adjoining pixels in each of the plurality of memory areas; a second memory section that has a plurality of memory areas equivalent to data of k2 rows of the image (k1 and k2 are natural numbers satisfying Omax< (k1+k2)<r where Omax is an offset maximum value set previously for the display section) and stores data of at least two adjoining pixels in a row different from pixels of which data is stored in the first memory section in each of the plurality of memory areas; and a correction section that corrects data of an object pixel to be processed, out of the pixels of r rows×c columns, using data of a plurality of pixels stored in a memory area corresponding to a position designated by an offset vector corresponding to the object pixel in the first memory section and the second memory section.

According to the above display apparatus, the time required to obtain data used for correction can be shortened without use of a high-speed clock for memory access.

According to a third aspect of the invention, an image processing method that processes an image displayed on a display section having pixels of r rows×c columns is provided. The method includes: storing data, to a first memory section that has a plurality of memory areas equivalent to data of k1 rows of the image, of at least two adjoining pixels in each of the plurality of memory areas; storing data, to a second memory section that has a plurality of memory areas equivalent to data of k2 rows of the image (k1 and k2 are natural numbers satisfying Omax<(k1+k2)<r where Omax is an offset maximum value set previously for the display section), of at least two adjoining pixels in a row different from pixels of which data is stored in the first memory section in each of the plurality of memory areas; and correcting data of an object pixel to be processed, out of the pixels of r rows×c columns, using data of a plurality of pixels stored in a memory area corresponding to a position designated by an offset vector corresponding to the object pixel in the first memory section and the second memory section.

According to the above image processing method, the time required to obtain data used for correction can be shortened without use of a high-speed clock for memory access.

BRIEF DESCRIPTION OF THE DRAWINGS

The invention will be described with reference to the accompanying drawings, wherein like numbers reference like elements.

FIG. 6 is a view showing a concrete example of allocation of memory areas.

FIG. 12 is a view showing Operation Example 1.

FIG. 13 is a view showing Operation Example 2.

FIG. 14 is a view showing Operation Example 3.

FIG. 15 is a view showing Operation Example 4.

DESCRIPTION OF EXEMPLARY EMBODIMENTS

1. Configuration

Figure 1:
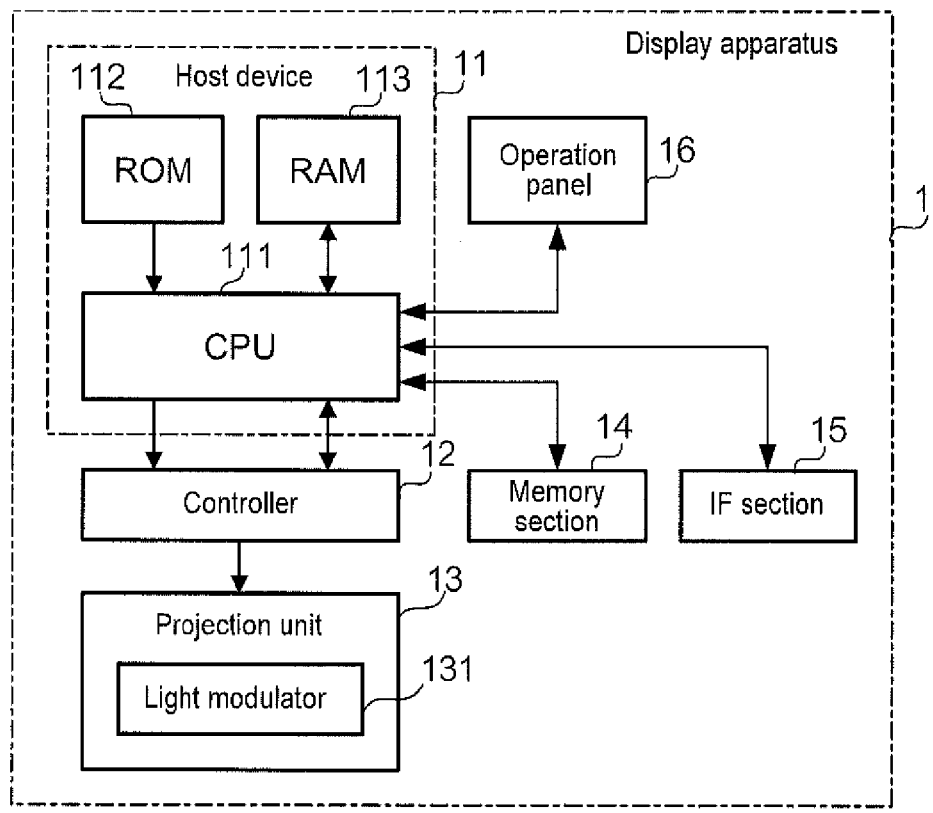
FIG. 1 is a block diagram showing a configuration of a display apparatus 1 according to an embodiment.

FIG. 1 is a block diagram showing a configuration of a display apparatus 1 according to an embodiment. The display apparatus 1 is a projective display apparatus that projects an image on a windshield of an automobile, a train, or a plane, for example, which is a so-called head-up display (HUD). When the display apparatus 1 is used for an automobile, the image projected is an image of a screen of a car navigation system or an image indicating measurement results of various instruments (e.g., a speedometer and a tachometer).

The display apparatus 1 has a host device 11, a controller 12, a projection unit 13, a memory section 14, an IF section 15, and an operation panel 16.

The host device 11, controlling the other components of the display apparatus 1, includes a central processing unit (CPU) 111, a read only memory (ROM) 112, and a random access memory (RAM) 113. The CPU 111 is a control device that controls the components of the display apparatus 1. The ROM 112 is a nonvolatile memory device that stores various programs and data. The RAM 113 is a volatile memory device that stores data, and functions as a work area when the CPU 111 executes processing.

The controller 12 is a device that controls the projection unit 13. In the illustrated example, the controller 12 functions as an image processing device that applies predetermined image processing to an input video signal. The controller 12 outputs the image-processed video signal to the projection unit 13.

The projection unit 13 projects an image on a screen in accordance with the image-processed video signal. The projection unit 13 has a light source, a light modulator 131, an optical system, and a drive circuit for these elements (illustration is omitted except for the light modulator 131). The light source may be a lamp such as a high-pressure mercury-vapor lamp, a halogen lamp, and a metal halide lamp, or a solid-state light source such as a light emitting diode (LED) and a laser diode. The light modulator 131 is a device that modulates light emitted from the light source in accordance with the video signal, and has a display section such as a liquid crystal panel and a digital mirror device (DMD), for example. The light modulator 131 has pixels arranged in a matrix of r rows and c columns, and modulates light for each pixel. The optical system is an element that projects the light modulated by the light modulator on the screen, and has a lens and a prism, for example.

The memory section 14 is a nonvolatile memory device that stores data and a program, such as a hard disk drive (HDD) and a solid-state drive (SSD). In the memory section 14, a program and map data for executing car navigation, for example, are stored. The host device 11 generates an image for car navigation using the program and data stored in the memory section 14 and outputs the generated image to a subsequent circuit.

The IF section 15 is an interface that mediates transmission/reception of a signal or data to/from an external device (e.g. various instruments). The IF section 15 has a terminal through which the signal or data is transmitted/received to/from an external device.

The operation panel 16 is an input device via which the user inputs an instruction to the display apparatus 1, and includes a keyboard, a button, or a touch panel, for example.

Figure 2:
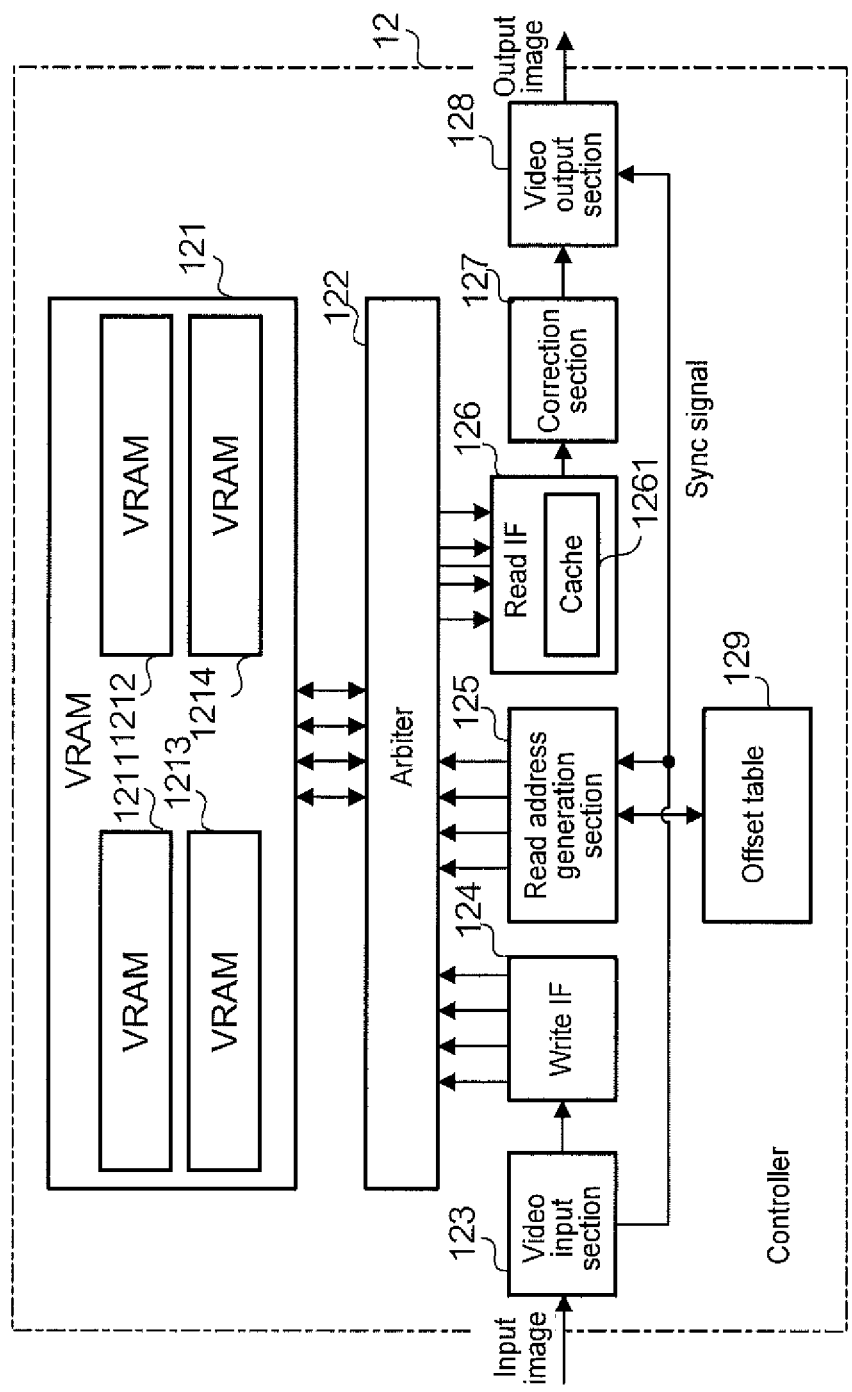
FIG. 2 is a view showing a configuration of a controller 12.

FIG. 2 is a view showing a configuration of the controller 12. The controller 12 has a video RAM (VRAM) 121, an arbiter 122, a video input section 123, a write IF 124, a read address generation section 125, a read IF 126, a correction section 127, a video output section 128, and an offset table 129.

The VRAM 121 is a memory (memory section) that has memory areas storing image data of a total of k rows and is used as a frame buffer, in which k is a natural number satisfying $$O_{max} < k < r \qquad (1)$$

where Omax is an offset maximum value previously set depending on the light modulator 131 used. The offset maximum value will be described later.

The VRAM 121 has four frame buffers VRAM 1211, VRAM 1212, VRAM 1213, and VRAM 1214 (examples of the first to fourth memory sections). Note that, when there is no need to distinguish the VRAMs 1211, 1212, 1213, and 1214 from each other, they are collectively referred to as the VRAM 121. The VRAM 1211, VRAM 1212, VRAM 1213, and VRAM 1214 have memory areas that store data of $k_1$, $k_2$, $k_3$, and $k_4$ rows, respectively, where $k_1$, $k_2$, $k_3$, and $k_4$ are natural numbers satisfying $k_1+k_2+k_3+k_4=k$. It is preferable that $k_1=k_2=k_3=k_4$.

Each of the VRAMs 1211 to 1214 is divided into a plurality of unit memory areas. Each unit memory area is specified by an address. Data of at least two pixels adjoining (sequential) in the row direction is stored in each unit memory area. That is, data of at least two sequential pixels adjoining in the row direction is stored in a packed state in a unit memory area specified by a given address. Data read and write are performed with such a plurality of pixels as one unit.

In this embodiment, data of two adjoining pixels is stored in each unit memory area. For example, when data of one pixel is 24 bits, the unit memory area has a memory capacity of 48 bits: data of the pixel smaller in the x coordinate is stored in higher-order 24 bits, and data of the pixel larger in the x coordinate is stored in lower-order 24 bits. The relationship between the memory areas of the VRAMs 1211 to 1214 and the pixels will be described later.

The VRAM 121 does not necessarily have memory areas of k rows×c columns as a whole. The VRAM 121 may have memory areas larger in number than k rows×c columns. In this case, part of the memory areas of the VRAM 121 may be divided into blocks and used. Otherwise, the memory area of a single RAM as hardware may be divided into four parts and such parts may be used as the VRAMs 1211 to 1214. Although the VRAM 121 is included in the controller 12 in the example in FIG. 2, the VRAM 121 may be provided outside the controller 12.

The arbiter 122 is a circuit that arbitrates rights to access the VRAM 121.

The video input section 123 receives a video signal (input video signal) from the host device 11, and outputs the input video signal to the write IF 124.

The write IF 124 writes the input video signal into the VRAM 121 as data. At this time, the write IF 124 writes the data into a memory area, out of the memory areas of the VRAM 121, corresponding to a row designated by a write counter. The write counter is a parameter that designates the row for which data write is performed. The write IF 124 has a register (memory section) (not shown) for storing the write counter.

The read address generation section 125 generates an address indicating a memory area where data used for correction of data of a pixel to be processed is stored (such an address is hereinafter referred to as a "read address"). The read address generation section 125 generates the read address using a read counter and an offset vector. The read counter is a parameter designating a row that serves as the reference of data read. The read address generation section 125 has a register (memory section) (not shown) for storing the read counter. The offset vector is obtained from the offset table 129, which is a memory storing a table where offset vectors are recorded. The offset vector will be described later.

The read IF 126 reads data from the VRAM 121. In this example, data of two adjoining pixels is included in a memory area designated by one address. The read IF 126 outputs data to be used for image processing, out of the read data, to the correction section 124.

The read IF 126 has a cache 1261, which is a memory (an example of the cache memory) that temporarily stores data already read from the VRAM 121.

The correction section 127 performs data correction. The correction section 127 performs the correction using data stored in a memory area designated by an address generated by the read address generation section 125, out of the data stored in the VRAM 121. A concrete method of the correction will be described later.

The video output section 128 outputs the data corrected by the correction section 127 to the subsequent projection unit 13 as a video signal.

Although illustration is omitted, the controller 12 also has an interface that transmits/receives data and instructions to/from the host device 11.

2. Outline of Distortion Correction

Figure 3A:
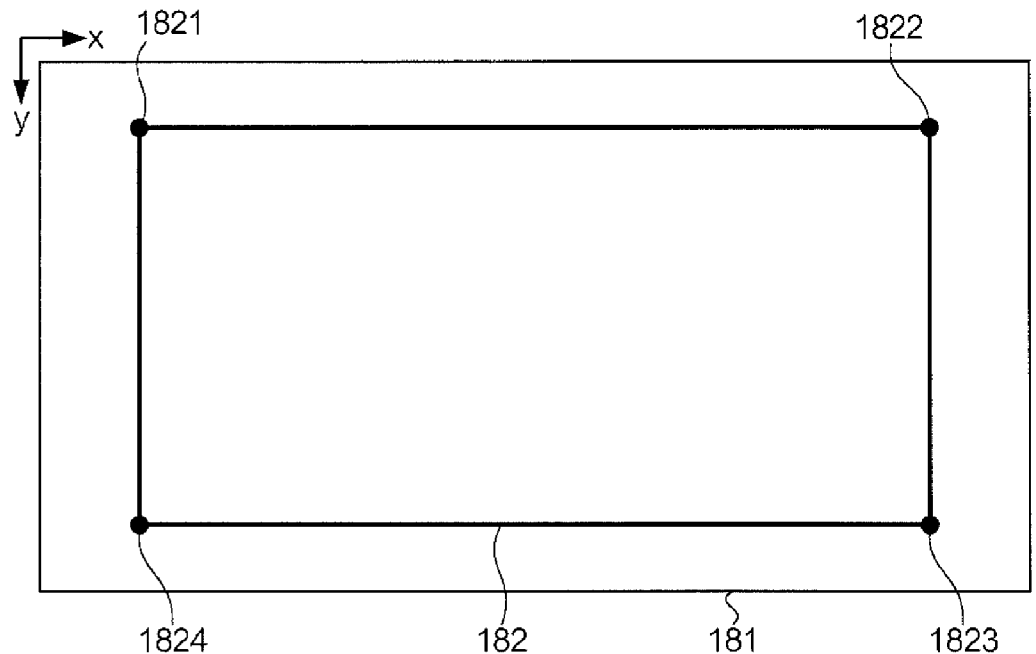
FIGS. 3A and 3B are views illustrating distortion of an projected image.
Figure 3B:
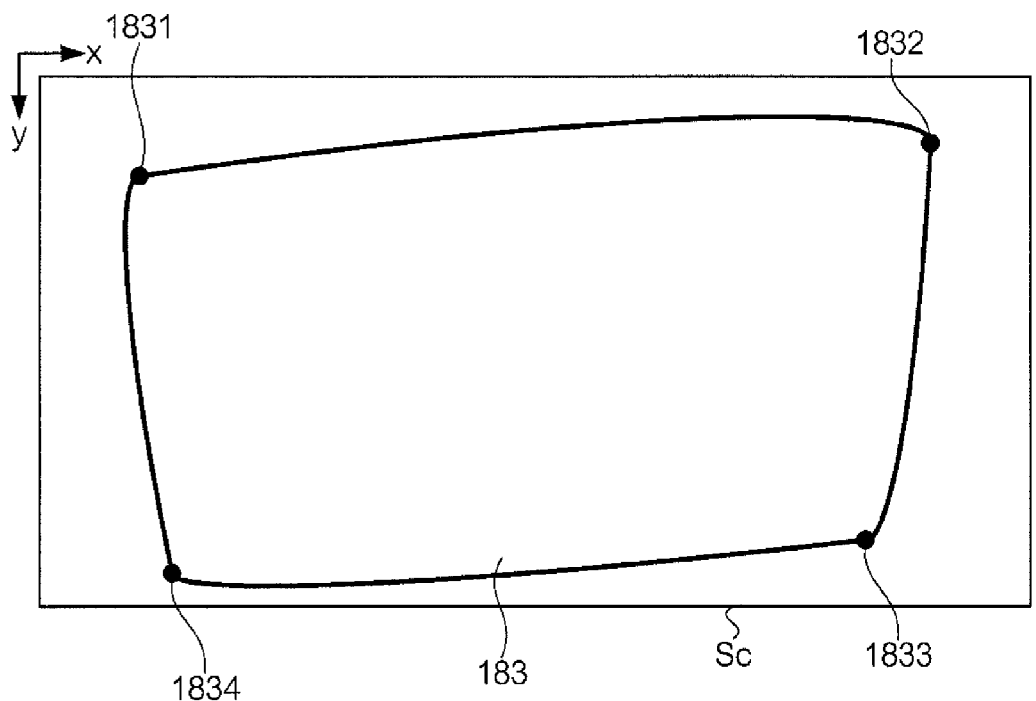

FIGS. 3A and 3B are views illustrating distortion of an image projected. FIG. 3A illustrates an image displayed on the light modulator 131, and FIG. 3B illustrates an image projected on a screen Sc. The light modulator 131 has a display area 181. In this example, a rectangle 182 is displayed on the display area 181. In response to the rectangle 182 displayed on the display area 181, a FIG. 183 is projected on the screen Sc. The FIG. 183 should be a rectangle if the positional relationship between the optical system of the projection unit 13 and the screen is ideal. In this example, however, since the positional relationship between the optical system and the screen is deviated from the ideal state, the FIG. 183 is distorted from a rectangle. The FIG. 183 has points 1831, 1832, 1833, and 1834 corresponding to the vertexes of the rectangle 182. An outline of a method for solving this distortion will be described hereinafter.

Figure 4A:
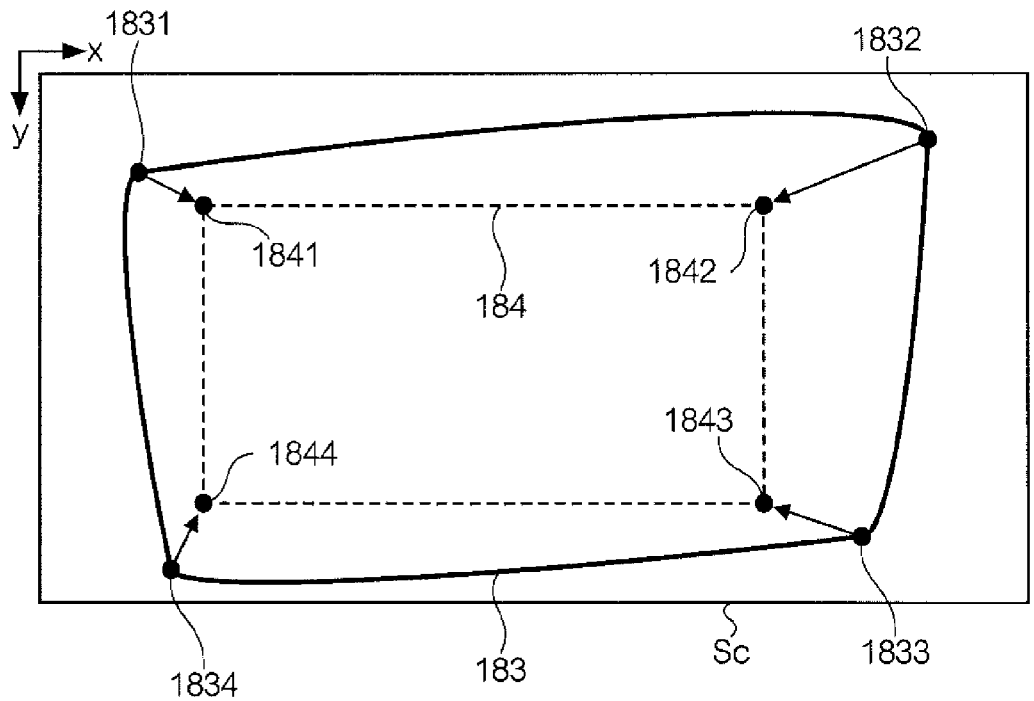
FIGS. 4A and 4B are views illustrating a FIG. 184 that is to be a post-correction target.
Figure 4B:
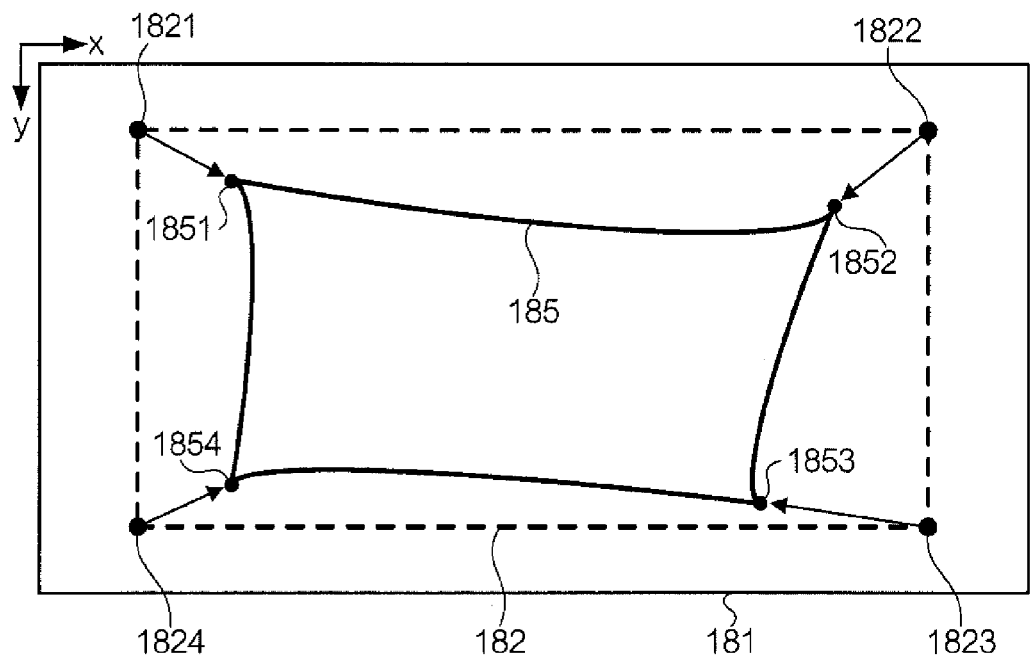

FIGS. 4A and 4B are views illustrating a FIG. 184 that is to be the post-correction target. FIG. 4A shows the FIG. 184 on the screen Sc. On the screen Sc, the FIG. 184 is a figure satisfying, for example, the conditions that (i) it has sides in predetermined directions (e.g., the vertical direction and the horizontal direction), (ii) it has the same aspect ratio as the rectangle 182, and (iii) a reference position of the FIG. 184 and a reference position of the FIG. 183 are in a predetermined positional relationship (e.g., the center of gravity of the FIG. 184 corresponds with the center of gravity of the FIG. 183). The FIG. 184 has vertexes 1841, 1842, 1843, and 1844. It is preferable that the FIG. 184 further satisfy the condition that (iv) it is inscribed in the FIG. 183 from the standpoint of maximizing the area of the post-correction image. In the example of FIG. 4A, however, the condition (iv) is not satisfied to make the FIGS. 183 and 184 easy to discern.

To simplify the description, first, consider only the points 1831, 1832, 1833, and 1834 of the FIG. 183. To obtain the FIG. 184 as the post-correction shape, these points should be moved to the vertexes 1841, 1842, 1843, and 1844, respectively. That is, for the data (e.g., gradation value) of the post-correction vertex 1841, the data of the point 1831 should be referred to. Note herein that a vector indicating a pre-correction point to be referred to (e.g., the point 1831) with respect to a post-correction point (e.g., the vertex 1841) as the reference is referred to as an offset vector. Since the vertexes

1841, 1842, 1843, and 1844 respectively refer to the different points 1831, 1832, 1833, and 1834, the offset vector is defined at each of the points.

The above-described idea can be applied, not only to the vertexes of the FIG. 184, but also to all points (i.e., all pixels) on the display area 181. For example, when a grid pattern, not a mere rectangle, is projected, an offset vector can be defined using a deviation of each grid square.

The offset vectors are uniquely determined if only the positional relationship between the optical system of the projection unit 13 and the screen is determined. For example, the offset vectors can be determined by projecting a predetermined test pattern with the projection unit 13, shooting the projected image with a camera, and analyzing the image. In the case that the positional relationship between the projection unit 13 and the screen remains unchanged afterwards once the projection unit 13 is placed, as in the case of using the apparatus as a HUD of an automobile, the determined offset vectors may be stored in a memory and referred to at the time of correction.

FIG. 4B shows a FIG. 185 on the light modulator 131. In this way, by displaying an image given a distortion opposite to that of the FIG. 183, the distortion-corrected FIG. 184 is displayed on the screen Sc.

The offset vector at a pixel P(x,y) on the display area 181 is herein represented by Vos(x,y). Note herein that the coordinates of the pixel at the upper-left corner in the figures are defined as (0,0), and the rightward and downward directions are defined as the positive directions of the x-axis and y-axis, respectively. Post-correction data Dr(P) of the pixel P(x,y) is expressed as follows using pre-correction data Do.

$$Dr(P(x,y))=Do(P(x,y)+Vos(x,y)) \quad (2)$$

The magnitude of the offset vector is referred to as the offset amount: the magnitudes of the offset vector in the x and y directions are respectively referred to as the x-direction offset amount and the y-direction offset amount. The offset amount can assume either of a positive value and a negative value depending on the direction of the offset vector.

While the offset amount is determined with the positional relationship between the optical system and the screen, the range within which the offset amount can assume is limited to some extent when the apparatus is intended for a particular use, such as for automobiles. The maximum value of a presumed offset amount is referred to as the offset maximum value. Offset maximum values may be set individually for both the positive and negative directions, or a single offset maximum value may be set in common for both the positive and negative directions.

When offset maximum values are set individually for both the positive and negative directions with respect to the forward direction of the read counter, Omax in Expression (1) has either of these two values whichever is larger.

Note that, while x and y of the pixel P(x,y) that is a real pixel are integers, the components of the offset vector Vos are not necessarily integers. When the components of the offset vector Vos are not integers, the position designated by the offset vector Vos is not a pixel itself but a point between a plurality of pixels. As for processing of such data, allocation of data to the VRAM 121 will be first described.

Figure 5:
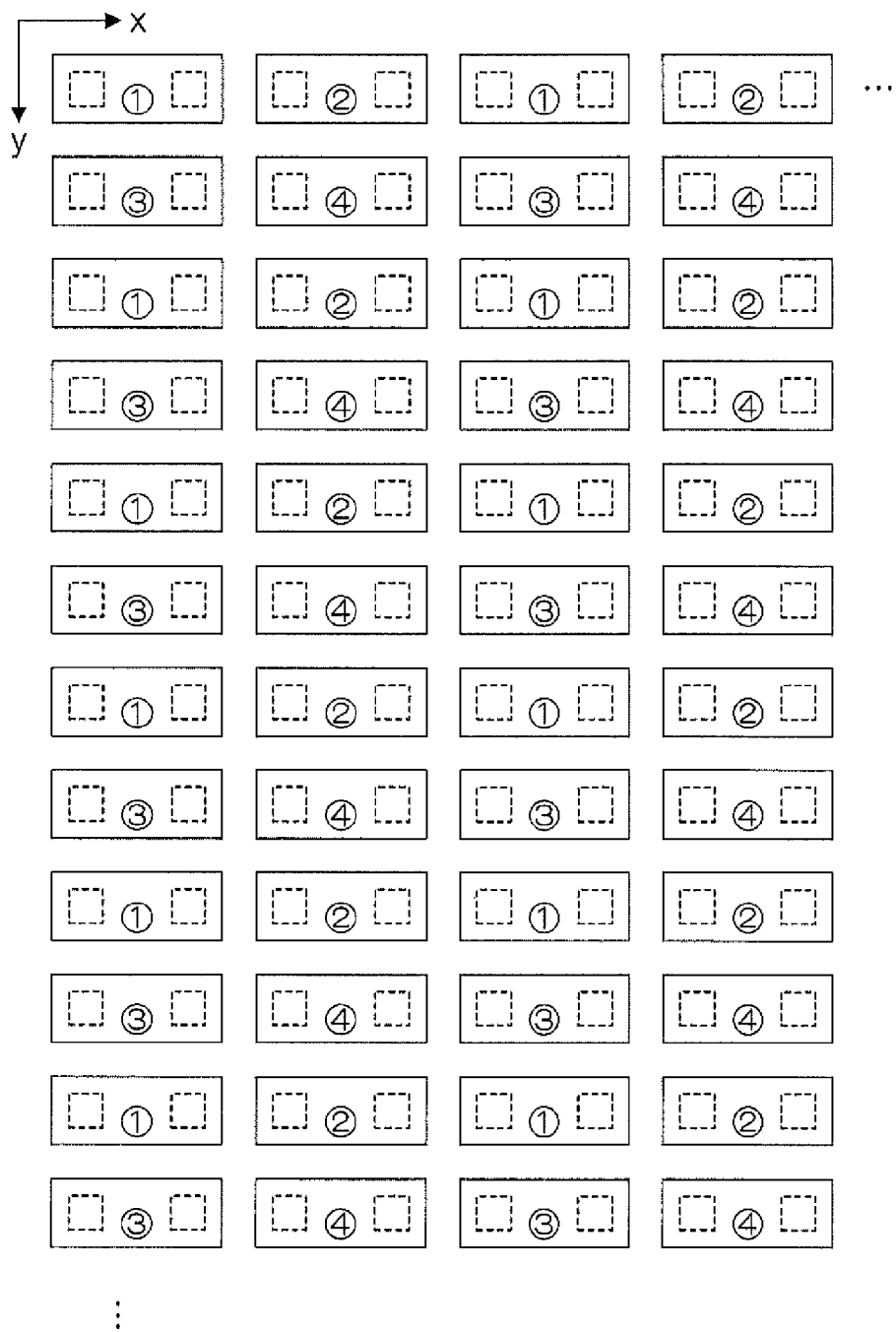
FIG. 5 is a view illustrating allocation of memory areas.

FIG. 5 is a view illustrating allocation of memory areas, where squares in broken lines represent pixels. In this example, for the data of the input image, unit memory areas of the VRAM 121 are allocated every eight pixels of two rows× four columns. Specifically, the eight pixels are divided into four portions, in two rows×two columns, each including two pixels adjoining in the row direction (capacity of each unit memory area) as a unit. Out of the four portions, data of the upper-left portion is stored in the VRAM 1211, data of the upper-right portion in the VRAM 1212, data of the lower-left portion in the VRAM 1213, and data of the lower-right portion in the VRAM 1214.

In the VRAM 121, assuming that a unit memory area in the j-th row and the i-th column is represented by A(i,j), data of a pixel P(4s,2t) and a pixel P(4s+1,2t) is stored in a unit memory area A(s,t) of the VRAM 1211. Data of a pixel P(4s+2,2t) and a pixel P(4s+3,2t) is stored in a unit memory area A(s,t) of the VRAM 1212. Data of a pixel P(4s,2t+1) and a pixel P(4s+1,2t+1) is stored in a unit memory area A(s,t) of the VRAM 1213. Data of a pixel P(4s+2,2t+1) and a pixel P(4s+3,2t+1) is stored in a unit memory area A(s,t) of the VRAM 1214.

FIG. 6 is a view showing a concrete example of allocation of memory areas. For example, in the VRAM 1211, data of a pixel P(0,0) and a pixel P(1,0) is stored in a unit memory area A(0,0), and data of a pixel P(4,0) and a pixel P(5,0) is stored in a unit memory area A(1,0). In the VRAM 1212, data of a pixel P(2,0) and a pixel P(3,0) is stored in a unit memory area A(0,0), and data of a pixel P(6,0) and a pixel P(7,0) is stored in a unit memory area A(1,0). In the VRAM 1213, data of a pixel P(0,1) and a pixel P(1,1) is stored in a unit memory area A(0,0), and data of a pixel P(4,1) and a pixel P(5,1) is stored in a unit memory area A(1,0). In the VRAM 1214, data of a pixel P(2,1) and a pixel P(3,1) is stored in a unit memory area A(0,0), and data of a pixel P(6,1) and a pixel P(7,1) is stored in a unit memory area A(1,0).

Figure 7:
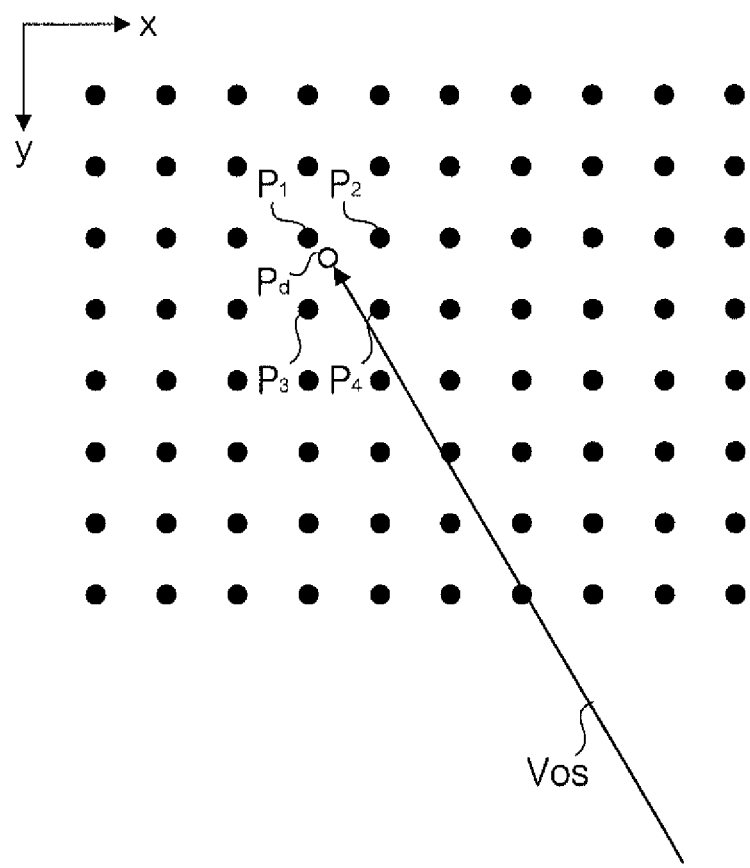
FIG. 7 is a view illustrating a position Pd designated by an offset vector.

FIG. 7 is a view illustrating a position Pd designated by an offset vector. When neither the x coordinate xd nor the y coordinate yd of the position Pd is an integer, four pixels are present around the position Pd. These four pixels are referred to as reference pixels $P_1(x_1,y_1)$, $P_2(x_2,y_2)$ $P_3(x_3,y_3)$, and $P_4(x_4,y_4)$. These coordinates satisfy the following.

$$x_2=x_1+1$$

$$y_2=y_1$$

$$x_3=x_1$$

$$y_3=y_1+1$$

$$x_4=x_2$$

$$y_4=y_3$$

$$x_1 \leq xd < x_2$$

$$y_1 \leq yd < y_2 \quad (3)$$

Referring back to FIG. 6, when the reference pixels $P_1$ to $P_4$ are (0,0), (1,0), (0,1), and (1,1), the data stored in the unit memory area A(0,0) of the VRAM 1211 (data of P(0,0) and P(1,0)) and the data stored in the unit memory area A(0,0) of the VRAM 1213 (data of P(0,1) and P(1,1)) are read. This involves two times of access to the memory, and thus the number of times of access to the memory can be half compared with the case of accessing data for each pixel.

As another example, when the reference pixels $P_1$ to $P_4$ are (3,1), (4,1), (3,2), and (4,2), data stored in the unit memory area A(1,1) of the VRAM 1211 (data of P(4,2) and P(5,2)), data stored in the unit memory area A(0,1) of the VRAM 1212 (data of P(2,2) and P(3,2)), data stored in the unit memory area A(1,0) of the VRAM 1213 (data of P(4,1) and P(5,1)), and data stored in the unit memory area A(0,0) of the VRAM 1214 (data of P(2,1) and P(3,1)) are read. This involves four times of access to the memory.

In the above case, the number of times of access to the VRAM 121 can be reduced by using data stored in the cache 1261, which will be described later in detail.

3. Operation

An example operation of the display apparatus 1 will be described hereinafter. In this example, assume that the light modulator 131 has a WVGA-equivalent resolution. That is, the light modulator 131 has pixels arranged in 480 rows and 800 columns (r=480, c=800). The offset maximum value is set to 120 (Omax=120). The VRAM 121 has memory areas for storing data of 241 rows. The 241 rows are based on the value obtained by doubling the offset maximum value (120 rows in this example) and adding the memory area for a pixel to be processed (1 row in this example) to the doubled value. The offset table 129 stores an offset vector for each pixel.

3-1. Outline

Figure 8:
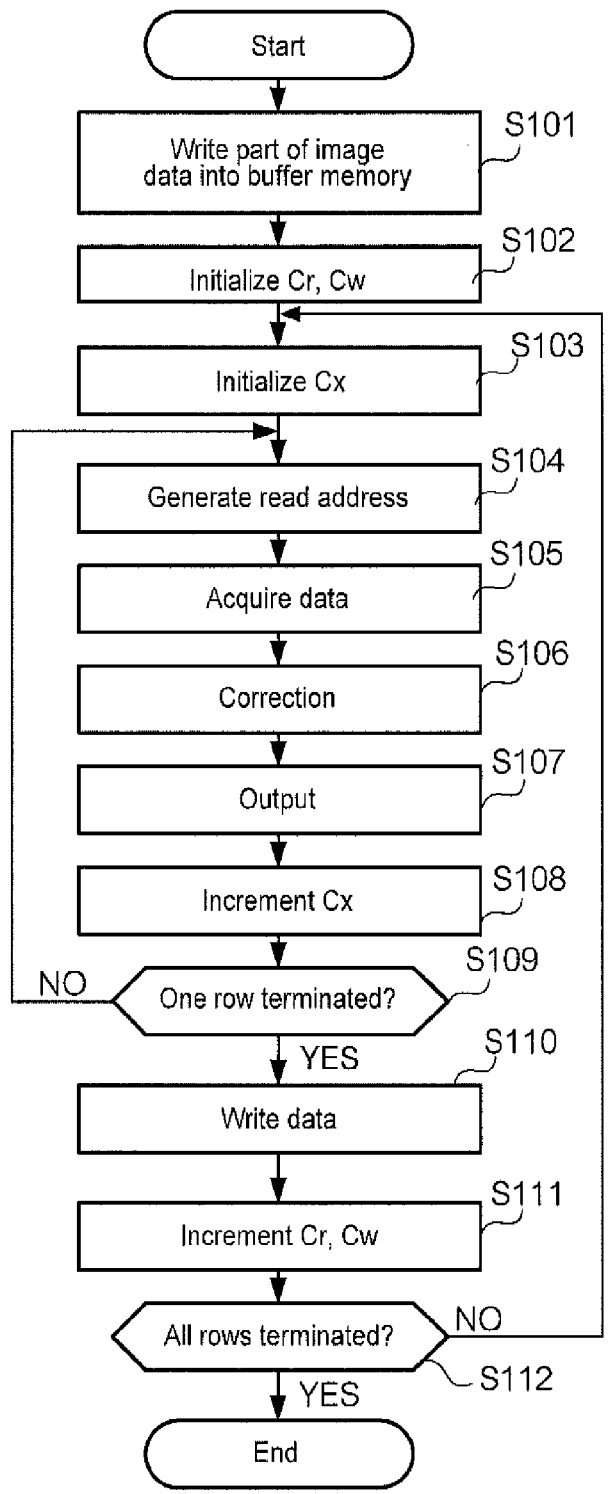
FIG. 8 is a flowchart showing an operation of the display apparatus 1.

FIG. 8 is a flowchart showing an operation of the display apparatus 1.

In step S101, the write IF 124 writes part of image data into the VRAM 121. The data written at this time is an amount of data equivalent to the offset maximum value, i.e., data of 120 rows in this example. That is, the write IF 124 writes data of the first to 120th rows of the image data into the VRAM 121.

The VRAM 121 has memory areas of the first to 241st rows. In step S101, the image data is written in the memory areas of the first to 120th rows.

In step S102, the read address generation section 125 and the write IF 124 initialize the read counter Cr and the write counter Cw, respectively. In this example, the counters are initialized to Cr=1 and Cw=Omax+Cr=121. The read counter Cr and the write counter Cw are counters indicating the positions of rows on the image data, which both assume values of 1 to 480 in this example. The difference between the write counter Cw and the read counter Cr is larger than at least the positive-direction offset maximum value.

In step S103, the read address generation section 125 and the correction section 127 initialize an x counter Cx, which is a parameter for specifying the pixel to be processed. The read address generation section 125 and the correction section 127 individually hold their x counters Cx, which are in synchronization with each other with a sync signal. In this example, the counters are initialized to Cx=1. The pixel to be corrected is hereinafter represented by a pixel Pc, which has coordinates (Cx,Cr).

In step S104, the read address generation section 125 generates a read address. The position designated by the offset vector Vos with reference to the pixel Pc is represented by the position Pd. The coordinates (xd,yd) of the position Pd is represented by Expression (4) below.

$$(xd, yd) = Pc + Vos \quad (4)$$

Data of the position Pd(xd,yd) is stored in a memory area of the kd-th row in the VRAM 121. The read address generation section 125 calculates the read address kd using Expression (5) below.

$$kd = yd (\bmod k) \quad (5)$$

For example, in the case that k=241, kd=yd when yd=1 to 241, and kd=2 when yd=243.

Figure 9:
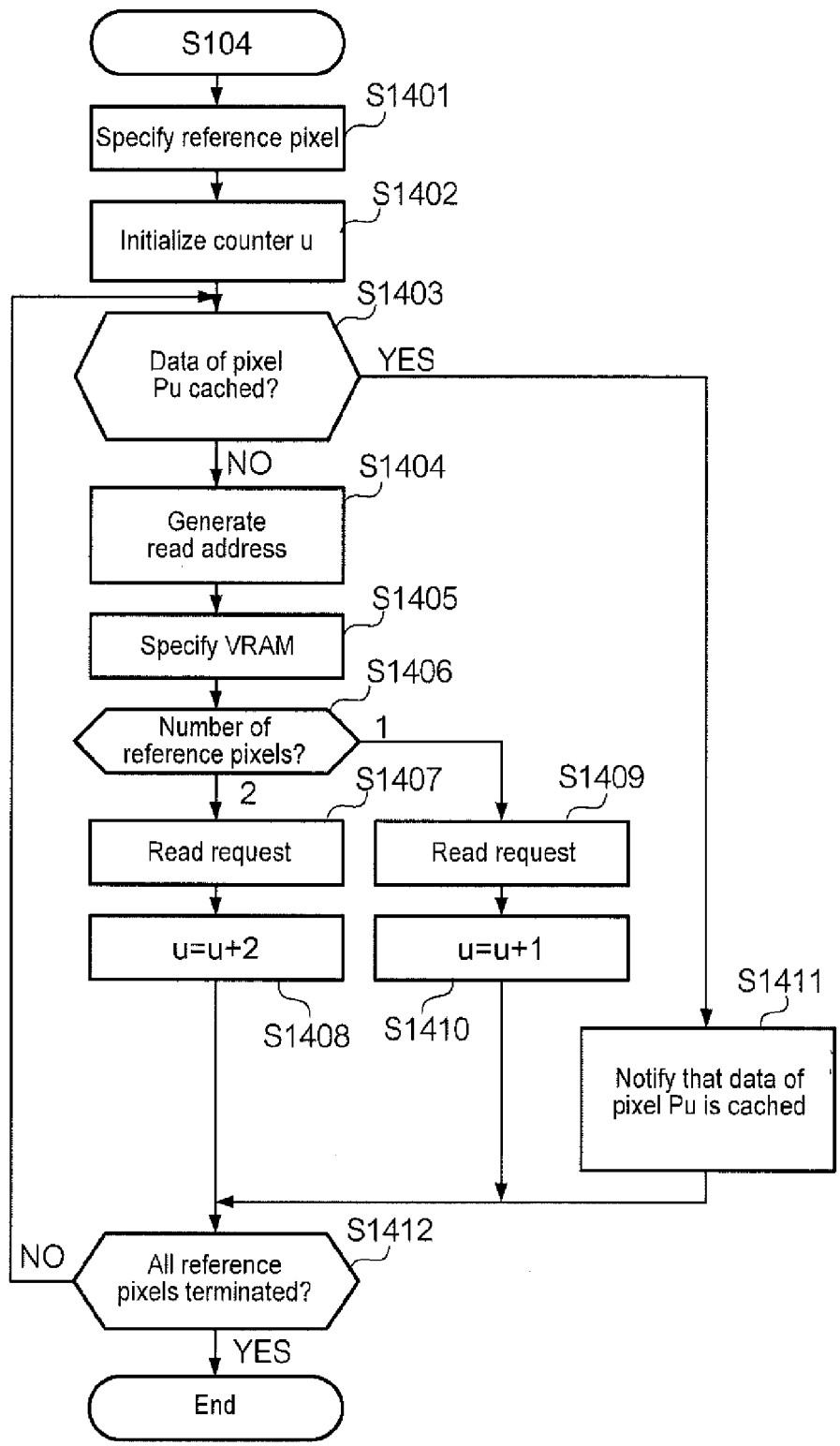
FIG. 9 is a view showing details of read address generation processing in step S104.

FIG. 9 is a view showing details of the read address generation processing in step S104.

In step S1401, the read address generation section 125 specifies a reference pixel.

In step S1402, the read address generation section 125 initializes a counter u, which is a counter that specifies an object pixel out of the pixels $P_1$ to $P_4$. In this example, the counter u is initialized to u=1.

In step S1403, the read address generation section 125 determines whether data of the pixel $P_u$ is stored in the cache 1261. In the cache 1261, data of a pixel used in the last correction is stored together with the coordinates of the pixel. If it is determined that data of the pixel $P_u$ is stored in the cache 1261 (YES in S1403), the read address generation section 125 shifts the processing to step S1411. If it is determined that data of the pixel $P_u$ is not stored in the cache 1261 (NO in S1403), the read address generation section 125 shifts the processing to step S1404.

In step S1404, the read address generation section 125 generates a read address corresponding to the pixel $P_u$. The read address generation section 125 generates the x coordinate $x_r$ and the y coordinate $y_r$ of the read address using Expressions (6) and (7) below.

$$x_r = \text{quotient}(4, x_u) - 1 \quad (6)$$

$$y_r = \text{quotient}(2, y_u) - 1 \quad (7)$$

where quotient (m,n) represents a quotient obtained by dividing n by m.

In step S1405, the read address generation section 125 specifies a VRAM in which the data of the pixel $P_u$ is stored using the following conditions (8) to (11).

$$\text{VRAM 1211 or 1213 when } \bmod(x_u, 4) = 0 \text{ or } 1 \quad (8)$$

$$\text{VRAM 1212 or 1214 when } \bmod(x_u, 4) = 2 \text{ or } 3 \quad (9)$$

$$\text{VRAM 1211 or 1212 when } \bmod(y_u, 2) = 0 \quad (10)$$

$$\text{VRAM 1213 or 1214 when } \bmod(y_u, 2) = 1 \quad (11)$$

In step S1406, the read address generation section 125 determines the number of reference pixels included in the unit memory area designated by the read address. When $\bmod(x_u, 2) = 0$ in the case of the counter u being an odd number, the read address generation section 125 determines that data of two reference pixels $P_u$ and $P_{u+1}$ is included in the unit memory area designated by the read address $(x_r, y_r)$. When $\bmod(x_u, 2) = 1$ in the case of the counter u being an odd number, the read address generation section 125 determines that data of one reference pixel (Pixel $P_u$) is included in the unit memory area designated by the read address $(x_r, y_r)$ (data of the remaining pixel is not used for correction). When the number of reference pixels included in the unit memory area designated by the read address $(x_r, y_r)$ is two (2 in S1406), the read address generation section 125 shifts the processing to step S1407. When the number of reference pixels included in the unit memory area designated by the read address $(x_r, y_r)$ is one (1 in S1406), the read address generation section 125 shifts the processing to step S1409.

In step S1407, the read address generation section 125 outputs a data read request to the VRAM 121. This read request is made for the specific VRAM specified in step S1405. The read request includes the read address and identifiers of the two pixels of which data is stored at this address, out of the pixels $P_1$ to $P_4$.

In step S1408, the read address generation section 125 updates the counter u, which is updated as u=u+2 in this case.

In step S1409, the read address generation section 125 outputs a data read request to the VRAM 121. This read request is made for the specific VRAM specified in step S1405. The read request includes the read address and an identifier of the one pixel of which data is stored at this address, out of the pixels $P_1$ to $P_4$.

In step S1410, the read address generation section 125 updates the counter u, which is updated as u u+1 in this case.

In step S1411, the read address generation section 125 outputs a notification that the data of the pixel $P_u$ is stored in the cache 1261 to the read IF 126.

In step S1412, the read address generation section 125 determines whether the processing has been completed for all the pixels $P_1$ to $P_4$. If it is determined that the processing has been completed for all the pixels $P_1$ to $P_4$ (YES in S1412), the read address generation section 125 terminates the processing in step S104. If it is determined that there is a pixel, out of the pixels $P_1$ to $P_4$, yet to be processed (NO in S1412), the read address generation section 125 shifts the processing to step S1403.

Referring back to FIG. 8, in step S105, the read IF 126 acquires data from the VRAM 121. The read request output from the read address generation section 125 in step S1407 or S1409 is sent to the VRAM 121 via the arbiter 122. The VRAM 121 reads data from a memory area at the designated address and outputs the data to the read IF 126 via the arbiter 122.

Figure 10:
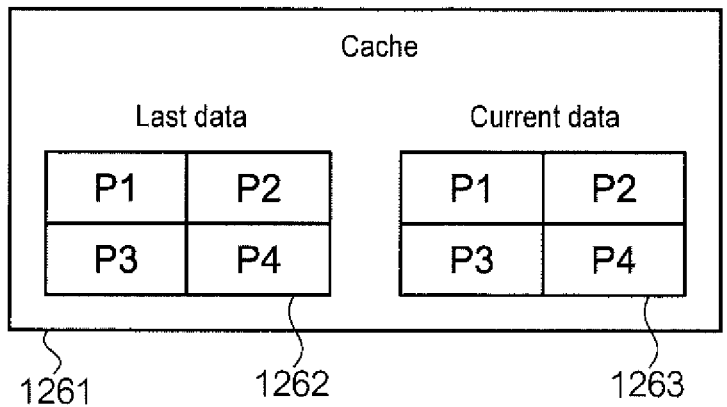
FIG. 10 is a view illustrating a configuration of a cache 1261.

FIG. 10 is a view illustrating a configuration of the cache 1261. In this example, the cache 1261 has memory areas 1262 and 1263, in each of which data of four pixels of two rows× two columns is stored. Data used in the last correction is stored in one of the memory areas 1262 and 1263, and data to be used for the current correction is stored in the other memory area. To simplify the description, assume herein that the last data is stored in the memory area 1262 and the current data is stored in the memory area 1263.

The read IF 126 extracts data of the reference pixels from the acquired data. To any data output from the VRAM 121, an identifier of each reference pixel included in the data is added. When it is indicated that data of the reference pixels $P_1$ and $P_2$ is included in the data, the read IF 126 extracts data of the higher-order 24 bits as data of $P_1$ and data of the lower-order 24 bits as data of $P_2$. When it is indicated that data of only the reference pixel $P_1$ is included in the data, the read IF 126 extracts data of the lower-order 24 bits as data of P. When it is indicated that data of only the reference pixel $P_2$ is included in the data, the read IF 126 extracts data of the higher-order 24 bits as data of $P_2$. When it is indicated that data of the reference pixels $P_3$ and $P_4$ is included in the data, the read IF 126 extracts data of the higher-order 24 bits as data of $P_3$ and data of the lower-order 24 bits as data of $P_4$. When it is indicated that data of only the reference pixel $P_3$ is included in the data, the read IF 126 extracts data of the lower-order 24 bits as data of $P_3$. When it is indicated that data of only the reference pixel $P_4$ is included in the data, the read IF 126 extracts data of the higher-order 24 bits as data of $P_4$.

The read IF 126 writes the data of the extracted reference pixels into the memory area 1263.

When being notified by the read address generation section 125 that the data of the pixel $P_u$ is stored in the cache 1261, the read IF 126 reads the data of the pixel $P_u$ from the memory area 1262 and writes the read data into the memory area 1263.

When the processing is completed for the reference pixels $P_1$ to $P_4$ in the flow in FIG. 9, data of the reference pixels $P_1$ to $P_4$ is written in the memory area 1263 accordingly. The read IF 126 outputs the data stored in the memory area 1263 to the correction section 127. Thereafter, the read IF 126 copies the data stored in the memory area 1263 to the memory area 1262.

In step S106, the correction section 127 corrects the data of the pixel Pc using Expression (2).

Figure 11:
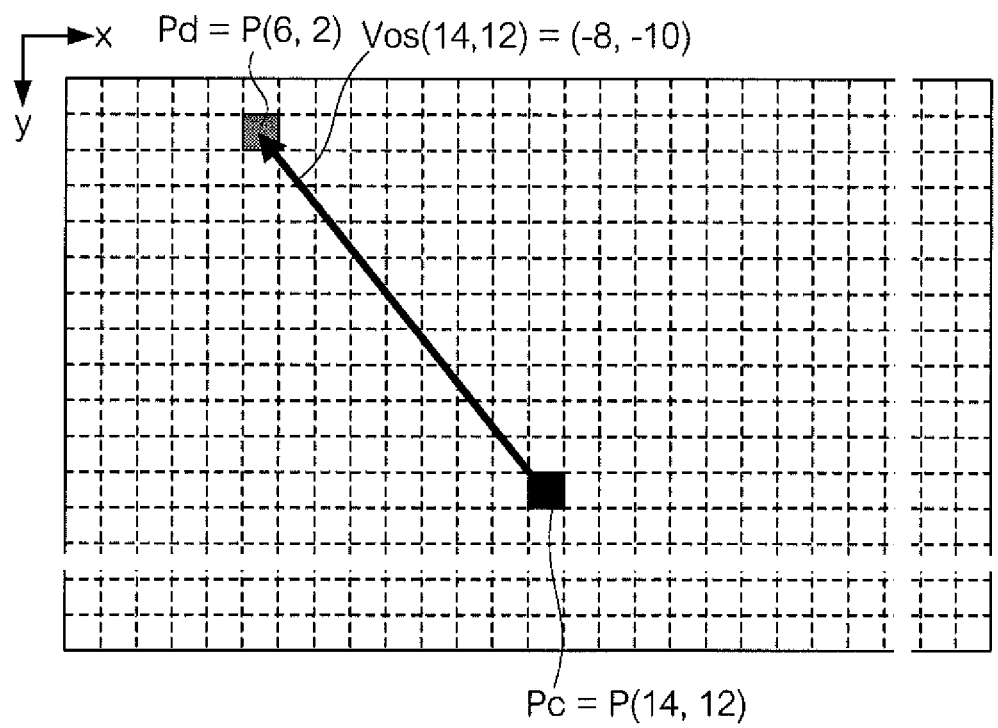
FIG. 11 is a view illustrating a pixel used for correction.

FIG. 11 is a view illustrating a pixel used for correction. In this example, Pc=P(14,12), and Vos(14,12)=(−8,−10). From Expression (4), the following is obtained.

$$Pd=(6,2) \qquad (12)$$

Substituting the above in Expression (2), the following is obtained.

$$Dr(14,12)=Do(6,2) \qquad (13)$$

Referring back again to FIG. 8, in step S107, the video output section 128 outputs the data of the pixel Pc corrected by the correction section 127 to the subsequent circuit (e.g., the drive circuit of the light modulator 131).

In step S108, the read address generation section 125 and the correction section 127 increment their x counters Cx.

In step S109, the correction section 127 determines whether processing of one row has been completed, i.e., whether Cx=801. If it is determined that the processing of one row has not yet been completed (NO in S109), the correction section 127 shifts the processing to step S104. If it is determined that the processing of one row has been completed (YES in S109), the correction section 127 shifts the processing to step S110.

In step S110, the write IF 124 writes data of the row designated by the write counter Cw into the VRAM 121. The data of the row designated by the write counter Cw is written into a memory area of the kw-th row in the VRAM 121. The value kw is calculated by Expression (14) below.

$$kw=Cw(\bmod k) \qquad (14)$$

For example, in the case that k=241, kw=Cw when Cw=1 to 241, and kw=2 when Cw=243.

In step S111, the read address generation section 125 and the write IF 124 increment the counters Cr and Cw.

In step S112, the read address generation section 125 determines whether the processing has been completed for all the rows, i.e., whether Cr=480. If it is determined that the processing has not yet been completed for all the rows (NO in S112), the read address generation section 125 shifts the processing to step S103. If it is determined that the processing has been completed for all the rows (YES in S112), the controller 12 terminates the processing in FIG. 8.

While an example of processing only one image (one frame) has been described, a plurality of frames of images may be processed continuously for processing of a moving image. For example, when Cw>r occurs during processing of the i-th frame, the write counter Cw may be initialized, and data of the (i+1)th frame may be written into the VRAM 121. In this case, when Cr>r occurs, the read counter Cr may be initialized, to start processing of the data of the (i+1)th frame.

As described above, according to this embodiment, the processing load can be reduced compared with the configuration in which a row including a pixel used for correction is selected and stored in a line buffer. Also, since the read counter and the write counter count at the same speed, such a problem that the read may outpace the write (image data of which write has not been finished may be read mistakenly) will not occur.

Also, according to this embodiment, it is only necessary to provide the controller 12 according to this embodiment between the host device 11 and the projection unit 13 (light modulator 131) for a configuration that is not according to the invention (a configuration that excludes the controller 12 from the example of FIG. 1). Thus, the function of correcting distortion can be introduced to a system having no support for distortion correction easily at low cost.

3-2. Operation Examples

More concrete examples of the operation will be described hereinafter.

3-2-1. Examples of Data Read

Examples of data read from the VRAMs 1211 to 1214 will be described hereinafter.

3-2-1-1. Operation Example 1

FIG. 12 is a view showing Operation Example 1. In this example, the reference pixels $P_1$ to $P_4$ are (0,0), (1,0), (0,1), and (1,1), and no data of the reference pixels is stored in the cache 1261. In this case, correction is performed using data read from the unit memory area A(0,0) of the VRAM 1211 and the unit memory area A(0,0) of the VRAM 1213. The data to be read is circled in the figure.

3-2-1-2. Operation Example 2

FIG. 13 is a view showing Operation Example 2. In this example, the reference pixels $P_1$ to $P_4$ are (1,0), (2,0), (1,1), and (2,1), and no data of the reference pixels is stored in the cache 1261. In this case, correction is performed using data read from the unit memory area A(0,0) of the VRAM 1211, the unit memory area A(0,0) of the VRAM 1212, the unit memory area A(0,0) of the VRAM 1213, and the unit memory area A(0,0) of the VRAM 1214.

3-2-1-3. Operation Example 3

FIG. 14 is a view showing Operation Example 3. In this example, the reference pixels $P_1$ to $P_4$ are (3,1), (4,1), (3,2), and (4,2), and no data of the reference pixels is stored in the cache 1261. In this case, correction is performed using data read from the unit memory area A(1,1) of the VRAM 1211, the unit memory area A(0,1) of the VRAM 1212, the unit memory area A(1,0) of the VRAM 1213, and the unit memory area A(0,0) of the VRAM 1214.

3-2-1-4. Operation Example 4

FIG. 15 is a view showing Operation Example 4. In this example, the reference pixels $P_1$ to $P_4$ at the last correction are (0,0), (1,0), (0,1), and (1,1), and the reference pixels $P_1$ to $P_4$ at the current correction are (1,0), (2,0), (1,1), and (2,1). In the cache 1261, data of the pixels (0,0), (1,0), (0,1), and (1,1) is stored. In this case, data read from the unit memory area A(0,0) of the VRAM 1212 and the unit memory area A(0,0) of the VRAM 1214 and data stored in the cache 1261 are used. In this case, therefore, data used for correction can be obtained with two times of access to the VRAM 121.

While the offset vector is defined for each pixel, the offset vectors of adjoining pixels are not different largely. In most cases, the reference pixels at the current correction are shifted by one pixel from the reference pixels at the last correction. Therefore, by use of the cache 1261, the number of times of access to the VRAM 121 can be widely reduced.

3-2-1-5. Operation Example 5

In this example, the reference pixels $P_1$ to $P_4$ are (0,−1), (1,−1), (0,0), and (1,0). That is, the reference pixels $P_1$ and $P_2$ are pixels falling outside the range of the original image data (hereinafter referred to as "original data"). As data of such a pixel outside the range of the original data, data of a predetermined value is used, which is stored in a register (not shown) in the read IF 126. When a reference pixel is outside the range of the original data, the read address generation section 125 notifies the read IF 126 of this fact.

3-2-1-6. Operation Example 6

In this example, the reference pixels $P_1$ to $P_4$ are (0,−2), (1,−2), (0,−1), and (1,−1). That is, all the reference pixels are pixels falling outside the range of the original data. When all the reference pixels are outside the range of the original data, the read address generation section 125 notifies the correction section 127 of this fact. In this case, the correction section 127 does not perform correction (interpolation) but outputs a predetermined value as it is as data of the object pixel to be processed.

Note that, during the time when data is being read from the cache 1261 or the register as in Operation Examples 4 to 6, there is no access to the VRAM 121 via the arbiter 122. It is therefore possible to access the VRAM 121 from another device (e.g., the host device 11).

3-2-2. Examples of Data Write/Read to/from VRAM 121

Examples of data write/read to/from the VRAM 121 will be described hereinafter, in which, for convenience of description, the VRAMs 1211 to 1214 are described as a single VRAM 121, not being distinguished from one another.

Figure 16:
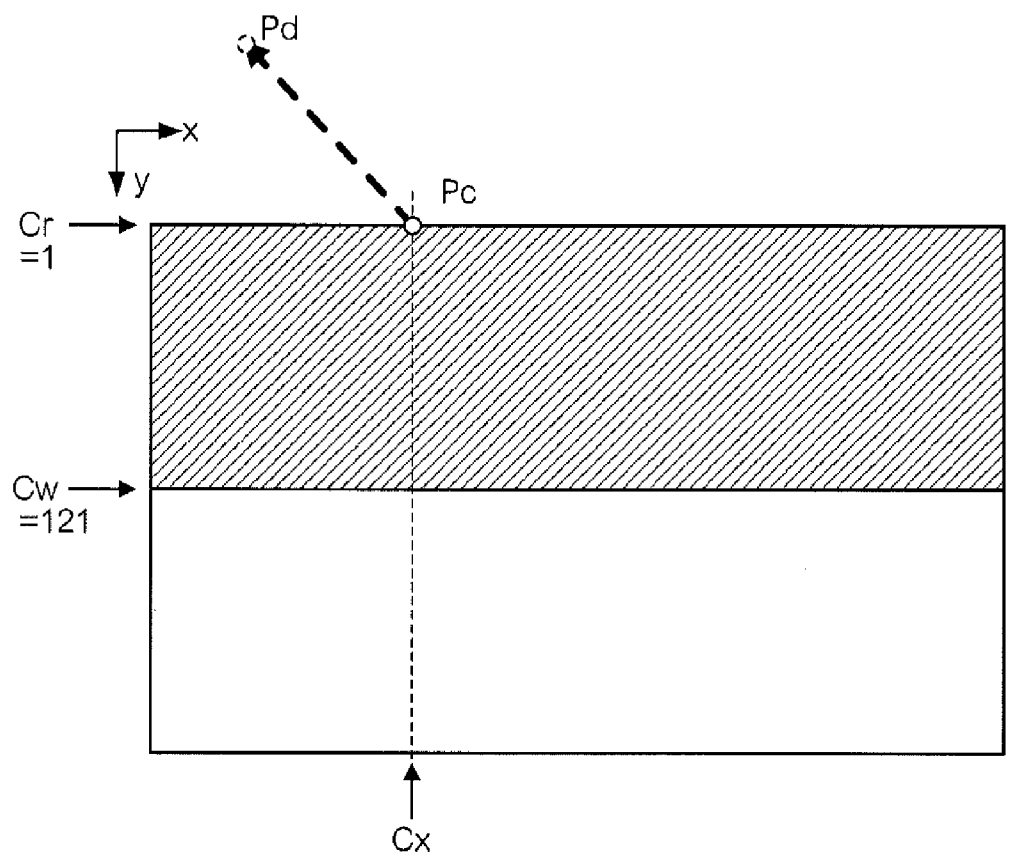
FIG. 16 is a view showing a state where Cr=1 and Cw=121.

FIG. 16 is a view showing a state where Cr=1 and Cw=121 (step S107), which is the state of the VRAM 121. The hatched portion indicates that data of the first to 120th rows is stored, and the non-hatched portion indicates that no data is stored (null values are stored).

In this example, both the x component and the y component of the offset vector Vos(Pc) are negative. That is, the reference pixel is a pixel that does not exist in the original data. In this case, the correction section 127 gives a predetermined value (e.g., a null value or a gray scale corresponding to black) as the post-correction data. In FIG. 16, Vos and Pd are represented by broken lines for the sake of convenience, indicating that a pixel nonexistent in the original data is being referred to.

Figure 17:
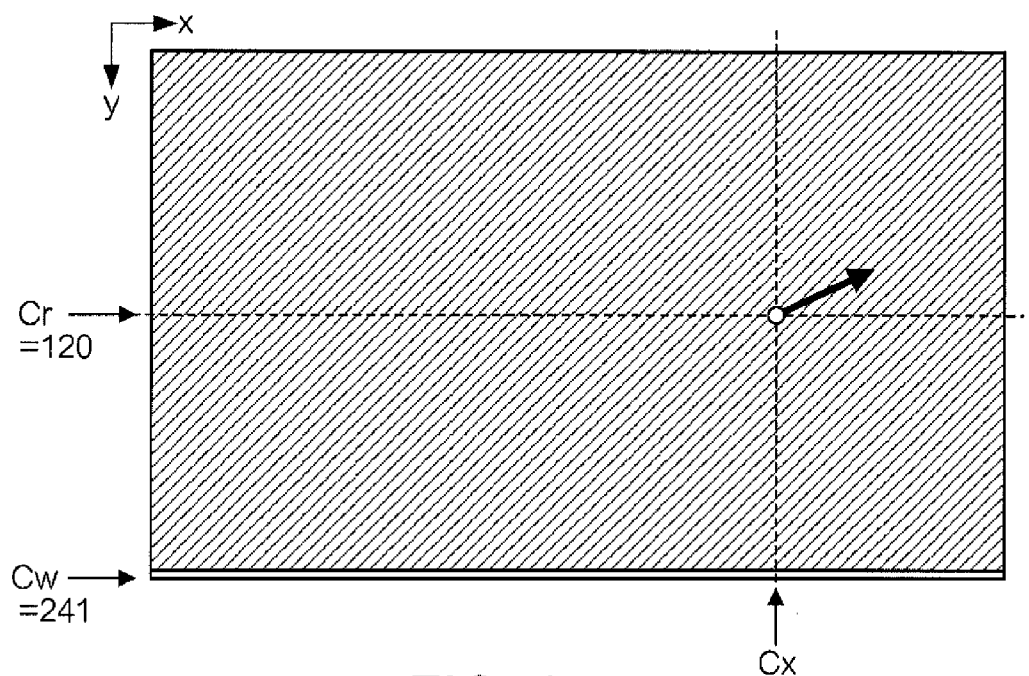
FIG. 17 is a view showing a state where Cr=120 and Cw=241.

FIG. 17 is a view showing a state where Cr=120 and Cw=241 (step S107). In this case, data of the first to 241st rows of the image is stored in the memory areas of the first to 241st rows of the VRAM 121.

Figure 18:
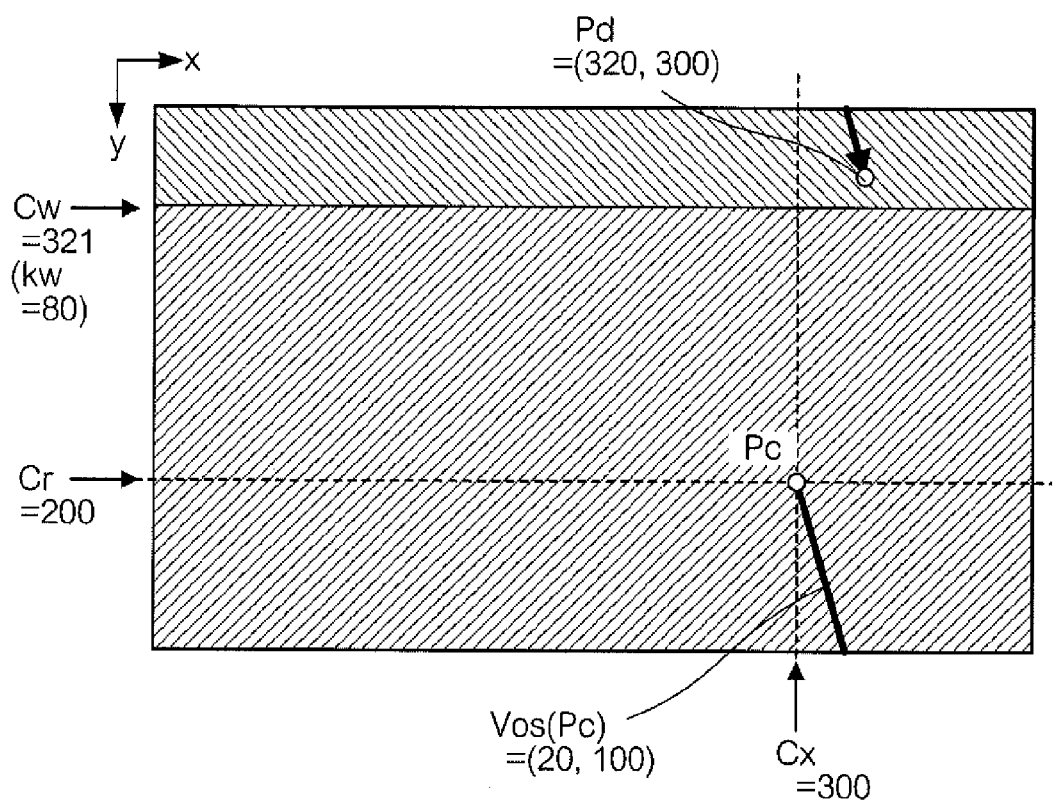
FIG. 18 is a view showing a state where Cr=200 and Cw=321.

FIG. 18 is a view showing a state where Cr=200 and Cw=321 (step S107). In this case, data of the 242nd to 321st rows of the image is stored in the memory areas of the first to 80th rows of the VRAM 121. Also, data of the 81st to 241st rows of the image is stored in the memory areas of the 81st to 241st rows of the VRAM 121. In this example, Pc=(300,200) and Vos(Pc)=(20,100). Substituting these in Expression (4), the following is obtained.

$$Pd=(320,300) \quad (15)$$

From Expression (5), $$kd=59 \quad (16)$$

Therefore, the data of the reference pixel $P_u$ is stored in the memory area of the 59th row of the VRAM 121.

In the VRAM 121, data of the number of rows equivalent to the offset maximum value is stored in both the positive and negative directions with respect to the forward direction of the read counter, permitting read of data used for correction.

4. Variations

The invention is not limited to the embodiment described above, but can be changed in various ways. Some of variations will be described hereinafter. Two or more of the following variations may be used in combination.

4-1. Variation 1

The number of frame buffers included in the VRAM 121 is not limited to four. For example, the VRAM 121 may two frame buffers.

Figure 19:
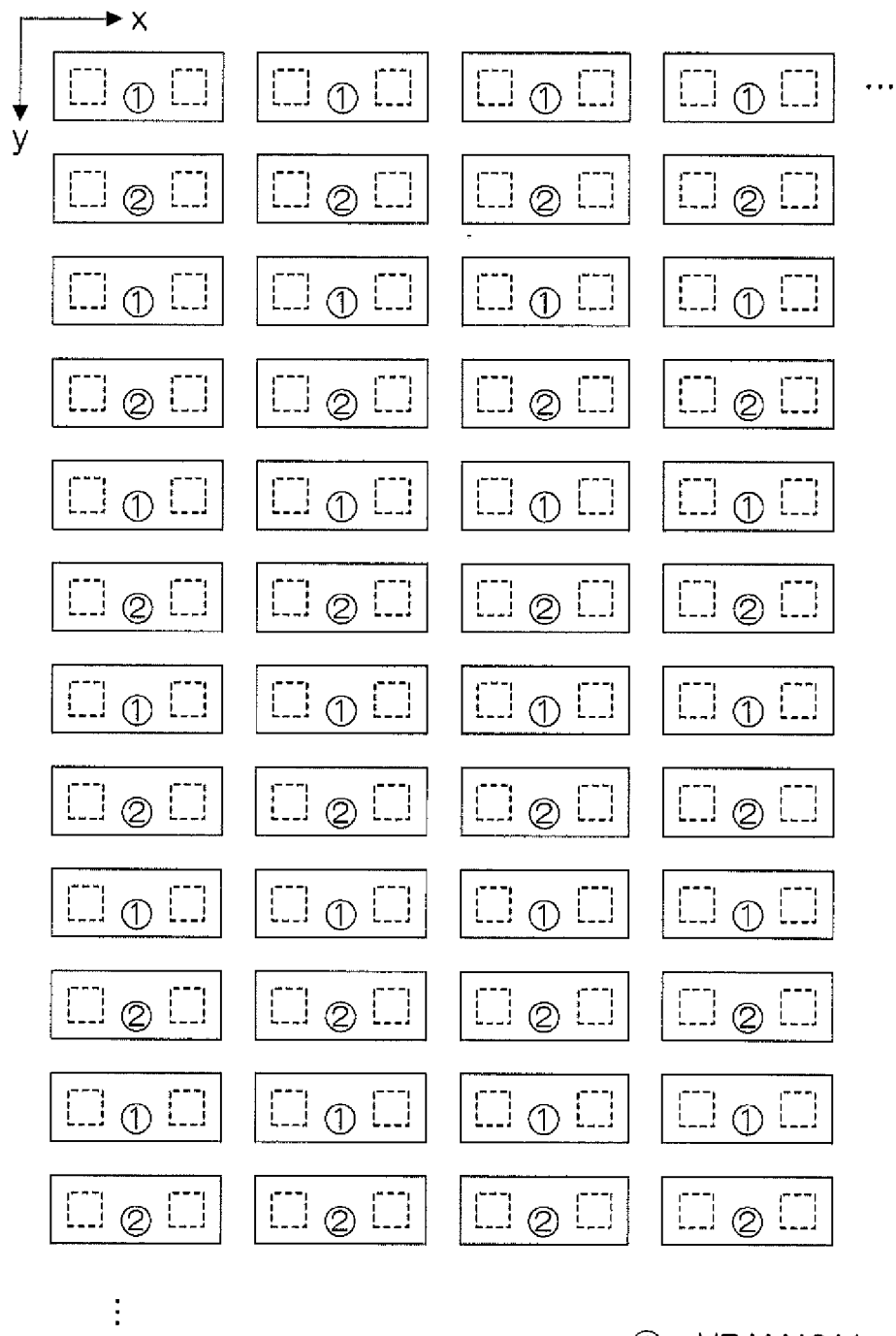
FIG. 19 is a view illustrating allocation of memory areas to two frame buffers.

FIG. 19 is a view illustrating allocation of memory areas in the case of using two frame buffers (VRAM 1211 and VRAM 1212). Data of a pixel P(2s,2t) and a pixel P(2s+1,2t) is stored in a unit memory area A(s,t) of the VRAM 1211. Data of a pixel P(2s,2t+1) and a pixel P(2s+1,2t+1) is stored in a unit memory area A(s,t) of the VRAM 1212.

In the above case, when the reference pixels $P_1$ to $P_4$ are (1,0), (2,0), (1,1), and (2,1), for example, it is necessary to access a single frame buffer twice sequentially. That is, two clocks are required to read the data. However, with the reduced number of divided frame buffers, the circuit scale can be more reduced.

The VRAM 121 may not include a plurality of frame buffers, but may serve as a single frame buffer.

4-2. Variation 2

The number of reference pixels used for correction is not limited to four, but (m×n) pixels of m rows and n columns around the position Pd designated by the offset vector may be used as the reference pixels. For example, 16 pixels of four rows×four columns around the position Pd designated by the offset vector may be used as the reference pixels.

4-3. Variation 3

The memory capacity of the VRAM 121 is not limited to k rows, but the VRAM 121 may have memory areas equivalent to all pixels of one frame, i.e., r rows. In this case, although the capacity of the VRAM 121 is large, the read and write control with the read counter and the write counter is unnecessary.

4-4. Variation 4

When the position Pd designated by the offset vector is between two pixels that are not packed, correction of displacing the position Pd to a position between two packed pixels may be made. With this correction, it is only necessary to access the VRAM 121 twice although four times of access to the VRAM 121 is necessary without this correction.

Figure 20:
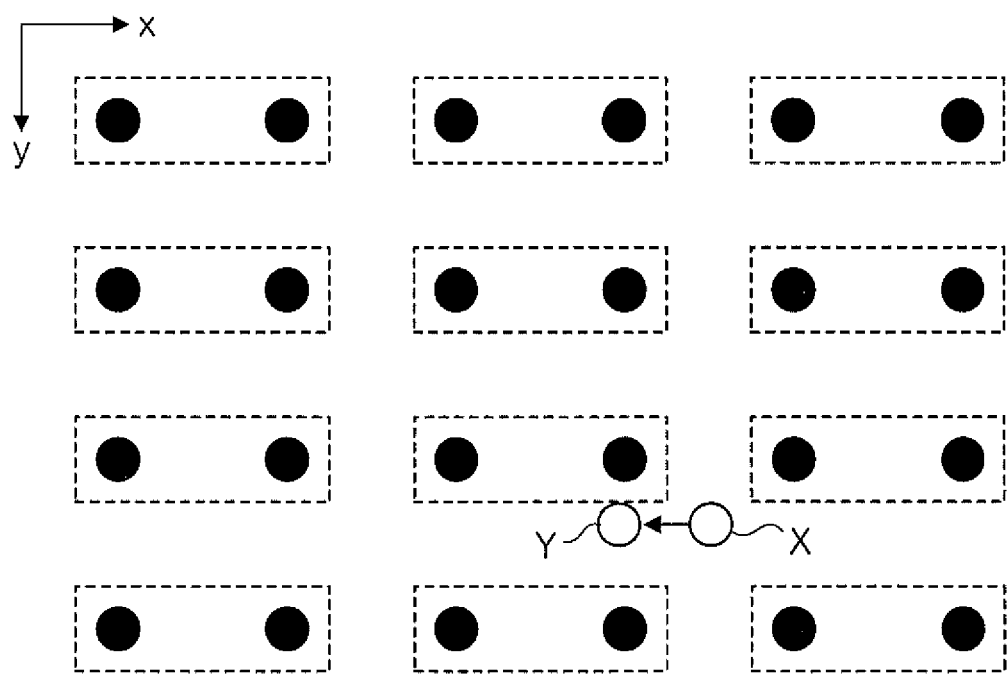
FIG. 20 is a view illustrating correction of the position Pd in Variation 4.

FIG. 20 is a view illustrating the correction of the position Pd in Variation 4, where point X indicates the position Pd before the correction, and point Y indicates the position Pd after the correction.

Also, in the case of FIG. 19, when the position Pd is between two pixels that are not packed, correction of displacing the position Pd to a position between two pixels that are packed may be made. With this correction, it is only necessary to access one frame buffer once, permitting read of data with one clock.

4-5. Variation 5

The read IF 126 may not have the cache 1261.

4-6. Variation 6

The offset vector Vos can be theoretically defined for all pixels P(x,y). However, when storing offset vectors of all pixels P(x,y) requires a large memory capacity, the offset vectors to be stored may be thinned. For example, offset vectors may be stored in the offset table 129 every two pixels in both the row and column directions. This results in storing offset vectors of only four corner pixels out of nine pixels of three rows×three columns. For the pixels of which offset vectors are not stored, offset vectors of such pixels may be calculated by interpolation using offset vectors of adjacent pixels of which offset vectors are stored.

For example, when Vos(1,1)=(p1,q1) and Vos(1,3)=(p2, q2) are stored in the offset table 129, and Vos(1,2) is not stored in the offset table 129, Vos(1,2) is calculated by $$Vos(1, 2) = \{Vos(1, 1) + Vos(1, 3)\}/2 \quad (17)$$
$$= [\{(p1 + p2)/2\}, \{(q1 + q2)/2\}]$$

4-7. Variation 7

The memory capacity of the VRAM 121 is not limited to that described in the above embodiment. For example, when offset maximum values are set individually for both the positive and negative directions with respect to the forward direction of the read counter, the VRAM 121 may have memory areas of the number of rows corresponding to the value obtained by summing the positive-direction offset maximum value, the negative-direction offset maximum value, and the memory area for the pixel to be processed. Concretely, when the positive-direction offset maximum value $O^+max=120$, the negative-direction offset maximum value $O^-max=80$, and the number of pixels to be processed is 1, the VRAM 121 may have memory areas of 201 (=120+80+1) rows. In this case, the value of the write counter Cw may be shifted by the negative-direction offset maximum value from the read counter Cr as in Expression (17) below.

$$Cw=Cr+O^-max \quad (18)$$

4-8. Other Variations

The display apparatus 1 is not limited to the HUD, but may be a normal projector. In this case, the invention may be applied to keystone correction of the projector. In particular, the invention is effective for a small projector such as a so-called pico-projector.

The configurations of the display apparatus 1 and the components of the display apparatus 1 are not limited to those illustrated in FIGS. 1 and 2. While an example where hardware (the controller 12) executes the flow in FIG. 8 has been described in the above embodiment, the CPU 111 of the host device 11 may execute the flow in FIG. 8 in accordance with a program. In this case, the controller 12 may be omitted. Also, while an example where the read counter and the write counter are stored in registers of the read address generation section 125 and the write IF 124 has been described in the embodiment, these counters may be stored in another memory device such as the VRAM 121.

The program to be executed by the CPU 111 may be presented as being stored in a computer-readable recording medium such as a magnetic recording medium (a magnetic tape, a magnetic disk (a HDD and a flexible disk (PD)), etc.), an optical recording medium (an optical disk (a compact disk (CD) and a digital versatile disk (DVD)), etc.), a magneto-optical recording medium, and a semiconductor memory (a flash ROM, etc.). Otherwise, the program may be downloaded via a network such as the Internet.

The invention may be applied to electronic equipment other than the display apparatus, such as an imaging apparatus. For example, the invention may be applied to correction in a digital still camera, a digital video camera, and a drive recorder.

This application claims priority from Japanese Patent Application No. 2014-112522 filed in the Japanese Patent Office on May 30, 2014, the entire disclosure of which is hereby incorporated by reference in its entirely.

What is claimed is:

1. An image processing device that processes a first image into a second image displayed on a light modulator having a plurality of pixels, comprising:
    a first memory that has a plurality of memory areas storing data in the m-th row (m is a natural number) of the first image, each of the plurality of memory areas stores data of at least two adjoining pixels of the m-th row;
    a second memory that has a plurality of memory areas storing data in the (m+1)th row of the first image, the plurality of memory areas stores data of at least two adjoining pixels of the (m+1)th row; and
    a processor configured to correct data of an object pixel to be processed, out of the plurality of pixels, using data in a corresponding memory area of the first memory corresponding to coordinates designated by an offset vector and data in a corresponding memory area of the second memory corresponding to the coordinates.

2. The image processing device according to claim 1, wherein
    the first memory has memory areas equivalent to data of m rows (m is a natural number) of the first image,
    the second memory has memory areas equivalent to data of n rows (n is a natural number) of the first image, and
    Omax<m+n is satisfied (where Omax is an offset maximum value set previously).

3. The image processing device according to claim 1, wherein,
    when the position of the coordinates designated by the offset vector is between the m-th row and the (m+1)th row, the processor performs the correction using data stored in a first memory area out of the plurality of memory areas of the first memory and data stored in a second memory area out of the plurality of memory areas of the second memory.

4. The image processing device according to claim 1, wherein,
    when the position of the coordinates designated by the offset vector is between a pixel corresponding to a first memory area out of the plurality of memory areas of the first memory and a pixel that adjoins the pixel corresponding to the first memory area and corresponds to a second memory area out of the plurality of memory areas of the first memory, the processor performs the correction using data sequentially read from the first memory area and the second memory area.

5. The image processing device according to claim 1, further comprising
    a cache memory that stores data stored in a first memory area out of the plurality of memory areas of the first memory and data stored in a second memory area out of the plurality of memory areas of the second memory, which are used in last correction by the processor,
    wherein, when performing the correction using the data in the first memory area and data stored in a third memory area out of the plurality of memory areas of the first memory, the processor acquires the data in the first memory area from the cache memory and acquires the data in the third memory area from the first memory.

6. The image processing device according to claim 1, further comprising:
    a third memory that stores data of at least two adjoining pixels including a pixel adjoining, in the same row, a pixel of which data is stored in the first memory; and
    a fourth memory that stores data of at least two adjoining pixels including a pixel adjoining, in the same row, a pixel of which data is stored in the second memory,
    wherein the processor corrects data of the object pixel using data of a plurality of pixels stored in memory areas, in the first memory, the second memory, the third memory, and the fourth memory, corresponding to a position designated by an offset vector corresponding to the object pixel.

7. A display apparatus comprising:
    a light modulator having a plurality of pixels;
    a first memory that has a plurality of memory areas storing data in the m-th row (m is a natural number) of the first image, each of the plurality of memory areas stores data of at least two adjoining pixels;
    a second memory that has a plurality of memory areas storing data in the (m+1)th row of the first image, each of the plurality of memory areas stores data of at least two adjoining pixels; and
    a processor configured to correct data of an object pixel to be processed, out of the plurality of pixels, using data in a corresponding memory area of the first memory corresponding to coordinates designated by an offset vector and data in a corresponding memory area of the second memory corresponding to the coordinates.

8. An image processing method that processes, via a processor, an image displayed on a light modulator having a plurality of pixels, the method comprising:
    storing, via the processor, data, to a first memory having a plurality of memory areas that store data in the m-th row (m is a natural number) of a first image, of at least two adjoining pixels in each of the plurality of memory areas;
    storing, via the processor, data, to a second memory plurality of memory areas that store data in the (m+1)th row of the first image, of at least two adjoining pixels in each of the plurality of memory areas; and
    correcting, via the processor, data of an object pixel to be processed, out of the plurality of pixels, using data in a corresponding memory area of the first memory corresponding to coordinates designated by an offset vector and data of a corresponding memory area of the second memory corresponding to the coordinates.

* * * * *